Feb. 8, 1938. W. F. HEWLETT 2,107,608
CONTRACTIBLE TENT OR AWNING
Filed Aug. 3, 1937 3 Sheets-Sheet 1

WILLIAM F. HEWLETT, Inventor

By Arthur P. Knight & Alfred W. Knight
Attorneys

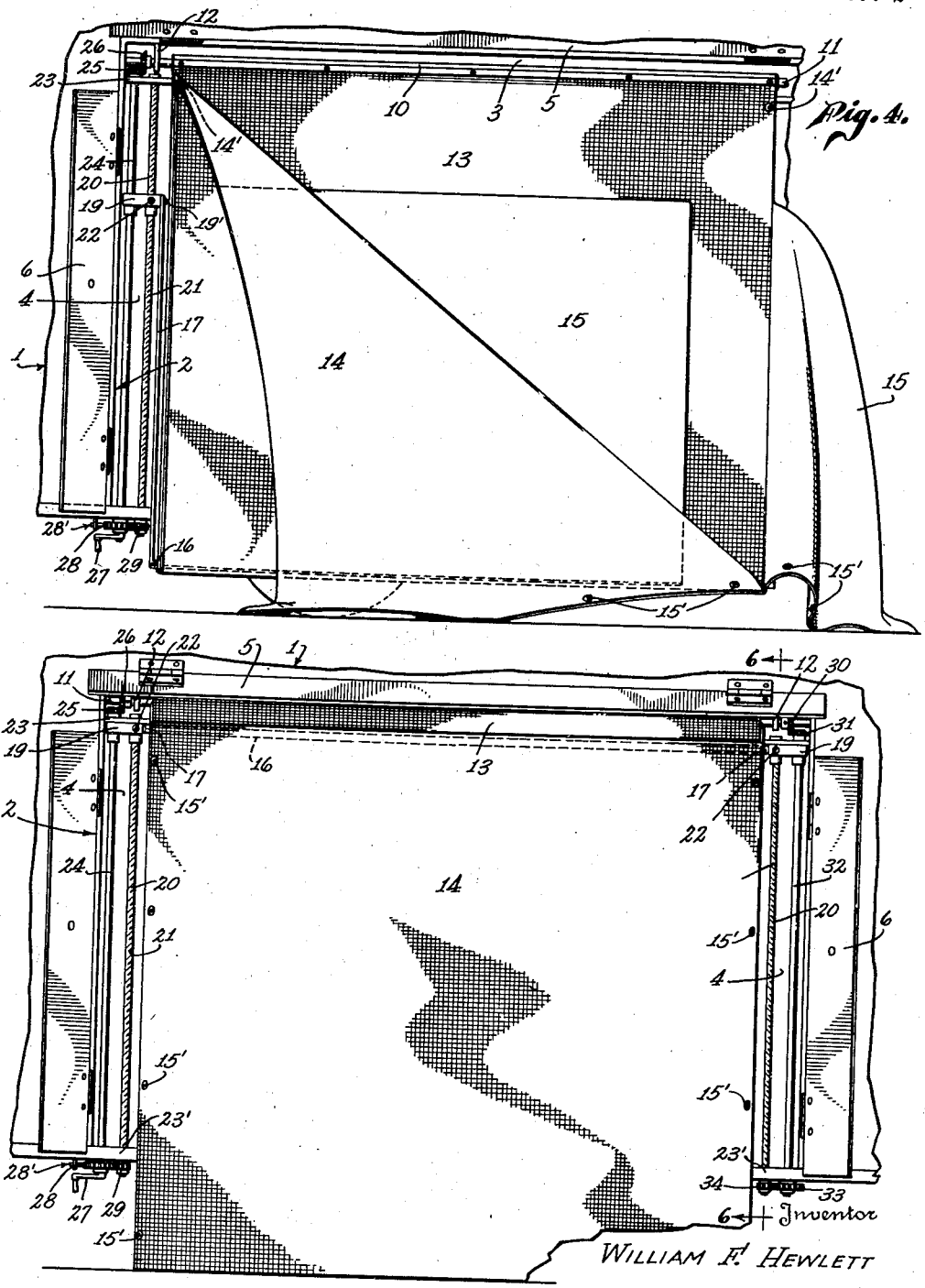

Feb. 8, 1938.  W. F. HEWLETT  2,107,608
CONTRACTIBLE TENT OR AWNING
Filed Aug. 3, 1937  3 Sheets-Sheet 3

Inventor
WILLIAM F. HEWLETT

By Arthur P. Knight + Alfred W. Knight
Attorneys

Patented Feb. 8, 1938

2,107,608

UNITED STATES PATENT OFFICE 2,107,608

CONTRACTIBLE TENT OR AWNING

William F. Hewlett, Upland, Calif.

Application August 3, 1937, Serial No. 157,128

4 Claims. (Cl. 135—1)

This invention relates to a contractible tent or awning which is particularly adapted for use in connection with automobile trailers, but is also applicable as an awning for general purposes.

The main object of the present invention is to provide a tent or awning which can be quickly and easily changed from contracted to extended position.

Another object of the invention is to provide a device of this character which when in contracted position is concealed from view and protected from the weather.

The accompanying drawings illustrate embodiments of the invention, and referring thereto:

Fig. 4 is a side elevation showing the tent or awning let down into position for convenient manipulation of same as hereinafter described.

Fig. 5 is a side elevation showing the tent or awning in fully extended position.

I will describe my invention in detail as applied to an automobile trailer, it being understood, however, that it can be applied in any connection where a tent or awning is to be supported in such manner that it can be placed in either contracted or extended position.

Figure 3:
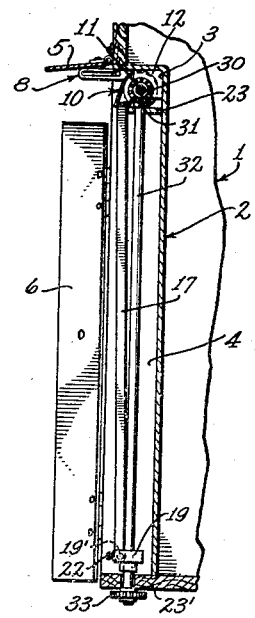
Fig. 3 is a vertical section on line 3—3 in Fig. 2.

A trailer indicated at 1 is provided with a suitable casing means 2 which may be built into the trailer or built onto or recessed into a trailer already constructed, said casing means forming a horizontal recess 3 and vertical recesses 4 extending downwardly from the ends of the horizontal recess 3, suitable closure means 5 and 6 being provided for these recesses, said closure means being, for example, formed as doors hinged to the casing and provided if desired with suitable fasteners 7 for holding them in closed position. Means such as a sliding bar 8 may be provided for holding the upper door 5 in raised position as shown in Fig. 3 when it is desired to unfold or extend the tent or awning.

A roller or drum 10 is mounted on a shaft 11 extending within the recess 3, said shaft being rotatably mounted in bearings 12 on the casing 2, and provided with suitable operating means hereinafter described. The tent or awning is secured to and winds on this roller and consists of suitable fabric or curtain means of canvas or other suitable flexible sheet material preferably formed in two sections, namely, an inner section 13 adapted to form the top of the tent or awning and an outer section 14 formed as outward continuation of the inner section 13 or connected to the outer edge thereof and adapted to form the side or vertical wall of the tent or awning. In addition, particularly when the device is used as a folding tent for trailers, the said flexible fabric or curtain means is also provided with flaps 15 at the respective ends of section 13. Button, snap, or other fasteners 14' are provided for securing the outer edge portion of section 14 to section 13 when in folded position, and similar fasteners 15' are provided for securing the outer edges of flaps 15 to adjacent edges of section 14 when in extended position.

Figure 7:
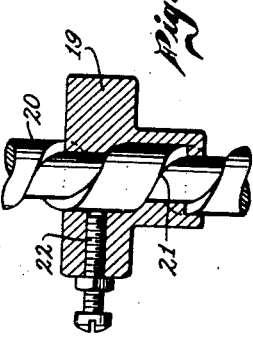
Fig. 7 is a detail section on line 7—7 in Fig. 6, showing the means for moving the arms for extending the tent or awning.

In order to hold the tent or awning in extended position a cross bar 16, connected to the curtain means at the junction of the sections 13 and 14 thereof, is provided with arms 17 which are connected by pivots 19' at their inner ends respectively to sleeves or nuts 19 sliding on and threadedly engaging vertical screw-rod members 20, each of which is rotatably mounted in suitable bearings 23 and 23' on the casing 2, and is provided, for example, with external threads 21 extending helically around the rod, and engaging internal threads or other means on the coacting nuts or sliding member 19 (see Fig. 7) so that rotation of the rod 20 will raise or lower the slide member 19 according to the direction of rotation of the rod. A set screw 22 may be provided, if desired, for securing the slide member in elevated position.

Suitable means are preferably provided for effecting simultaneous operation of the curtain roller 10 and operation of the elevating rods 20, said means comprising, for example, a vertical shaft 24 extending in a recess 4 and journaled in suitable bearings 23 and 23' in the casing 2, the shaft 24 carrying at its upper end a bevel gear 25 engaging a corresponding bevel gear 26 on the shaft 11 of the roller 10 and being provided at its lower end with a handle or crank 27 for manual operation thereof and with a gear 28 engaging a gear 29 on the lower end of the screw rod 20 at that side of the device. In order to operate the screw rod 20 at the other end of the device the shaft 11 for the roller 10 may be provided at such other end with a bevel gear 30 engaging a bevel gear 31 on a vertical shaft 32 which is rotatably mounted in the other recess 4 in suitable bearings on the casing 2 and is connected at its lower end by suitable gears 33 and 34 to the vertical rod or screw means 20 at that end. It will be understood that the pitch of the screw means and the ratio of the gears will be determined by the requirements of any particular case; the parts being so proportioned that when the flexible member 13 is fully unwound from the roller, the slide members 19 will be raised sufficiently to cause the arms 17 to hang downwardly as shown in dotted lines in Fig. 5, into position to bring the section 14 into convenient position for manipulation as hereinafter set forth. In this position of the parts, the slide members 19 are near the top of the screw threads or helical means on screw rods 20, but such thread means extend upwardly somewhat farther, so that continued operation of handle 27 in the same direction will still further elevate the slide members 19 until they are brought against bearings 23 or other stop means, which are suitably positioned to give the desired inclination to the top of the tent, and in this further operation of the handle the roller 10, being rotated farther in the same direction, effects partial reverse winding thereon of the section 13 of the tent or awning. The slide members 19 preferably slide on the shafts 24 and 32 as well as on the rod 20 so as to provide a better support.

It will be understood that instead of the casing 2 any other suitable supporting means may be provided for the tent or awning means and its associated operating structure.

Figure 1:
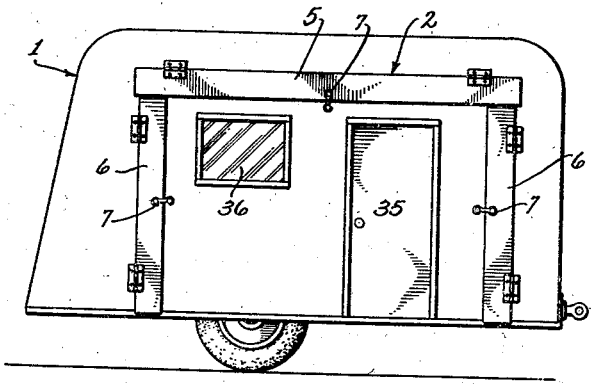
Fig. 1 is a side elevation of a trailer provided with the awning, the parts being shown in position wherein the awning or tent is in contracted and protected position.
Figure 2:
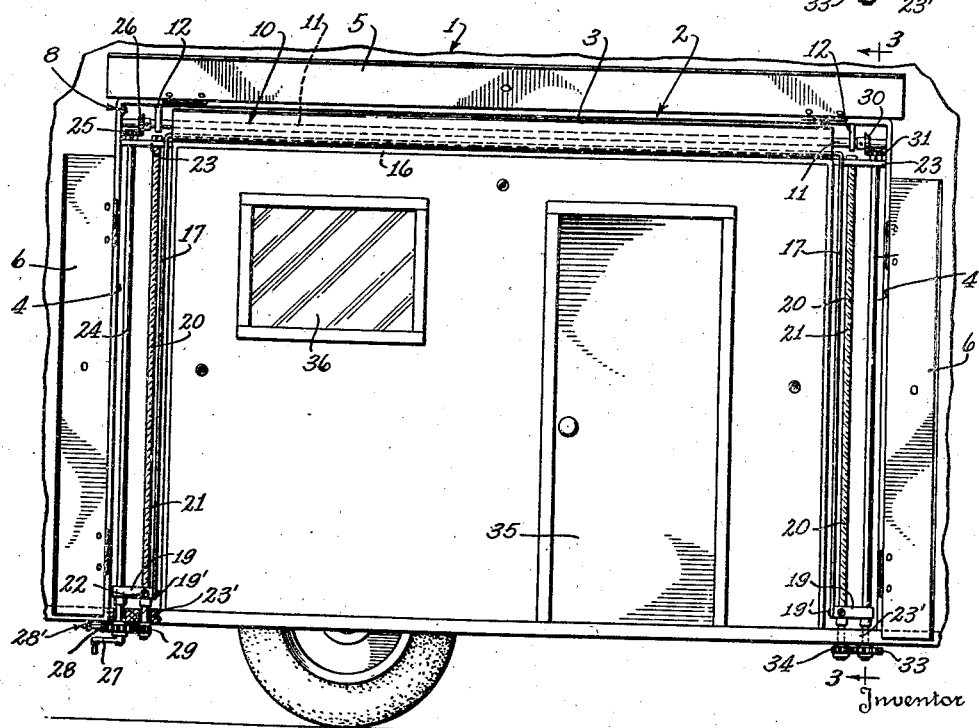
Fig. 2 is a side elevation showing the tent or awning exposed but contracted, with the upper closure member swung back to more clearly show the interior parts.
Figure 8:
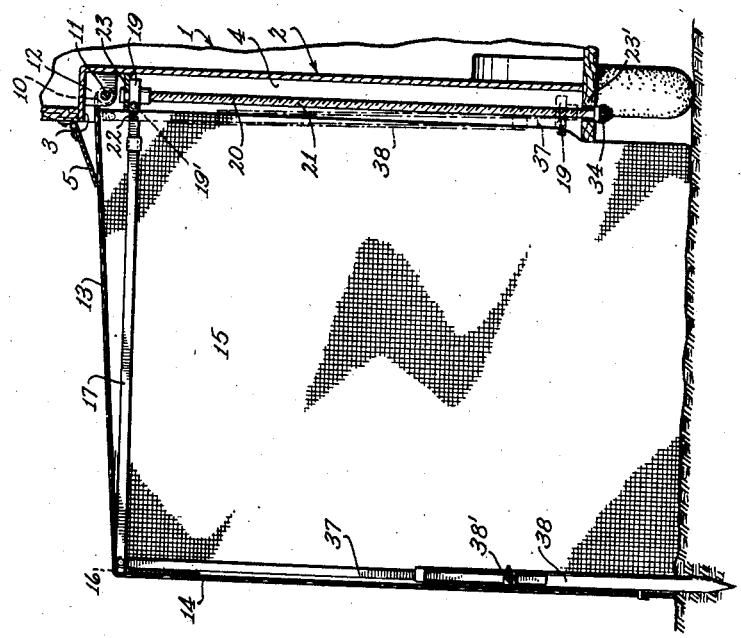
Fig. 8 is a view similar to Fig. 6, showing auxiliary supporting means in the form of legs for supporting the ends of the tent or awning when in extended position.

When the device is applied as described in connection with a trailer, the parts will normally be in contracted position and enclosed within the recesses 3 and 4, the doors 5 and 6 being closed and fastened as shown in Fig. 1 so as to protect all the parts from the weather and present a neat appearance. The described construction does not interfere with access to or outlook from the trailer; for example through door 35 and window 36. When the tent is to be used, the doors 5 and 6 are opened, as shown in Figs. 2 and 3. In this position the curtain means or tent is completely wound on roller 10, the slide members 19 are at their lowest position, and the arms 17 extend approximately vertically within the recesses 4 from the slide members 19 to the cross bar 16 which is then adjacent the roller 10.

Figure 6:
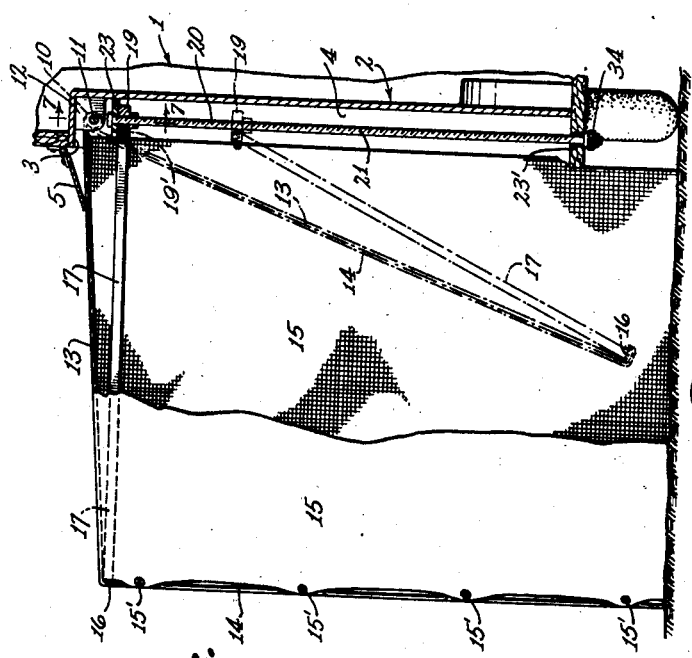
Fig. 6 is a transverse section showing the tent or awning in extended position, taken on line 6—6 in Fig. 5.

When it is desired to extend the tent or awning to position for use, the handle 27 is operated to turn roller 10 so as to unwind the curtain means from the roller and permit its outer edge to move outward and downward by gravitative action, while at the same time the slide members 19 are moved upwardly, by rotation of screw rods 20, so as to raise the inner ends of arms 17 to the position shown in Fig. 4 and in dotted lines in Fig. 6, the tent or curtain means being then wholly unwound from roller 10. In this position the outer section 14 of the tent is folded over and in front of the inner section 13 and is secured thereto at its upper edge by fasteners 14' and the flaps 15 are folded back between sections 13 and 14, the assemblage of sections 13, 14 and 15 hanging from the roller 10 in convenient position for manipulation thereof, as shown in Fig. 4. The operator then unfastens the buttons, snaps or other fasteners 14' and allows sections 14 and flaps 15 to drop or be extended at the outer side and ends respectively. Operation of handle 27 is then continued to wind the tent section 13 part way back on roller 10, in the opposite direction, and to raise the arms 17 further to the position shown in Figs. 5 and 6. The tent section 13 then extends outwardly from the roller to form the top of the tent, and the section 14 and flaps 15 extend vertically to form the outer side and ends of the tent, the inner side of the tent being formed by the trailer wall, so that access to the tent can be had through door 35. The flaps 15 can then be secured to the section 14 by fasteners 15'. The tent may be held in this extended position by any suitable releasable means adapted to engage and position a movable part of the mechanism, such as a catch member 28' adapted to be moved into engagement with gear 28, or the set-screw 22 adapted to clamp a slide member 19 in raised position as above described.

To fold or store the tent the reverse procedure to the above is followed, in obvious manner. When the tent or awning means is re-wound on the roller, the assemblage of curtain parts 13, 14 and 15 which have been folded and fastened as above described, are wound together on the roller.

When the tent is in extended position it may be further supported, if desired, as shown in Fig. 3, by legs 37 pivotally secured to the outer ends of arms 17 and adapted to swing down into position to rest on or engage the ground. Each leg 37 may be provided with a sliding extension 38, to provide the necessary length, such extension being clamped to the leg by means 38' when in use, and being slid back and secured in retracted position when the leg is folded against the arm 17, as shown in dotted lines.

It will be seen that when the parts are in contracted position the device does not increase the width of the trailer, and when the tent is in extended position it provides additional room space, easily accessible through the trailer door. By using a similar tent at each side of the trailer the housing or sheltering capacity of the trailer may be practically tripled, or the tent at one side may be used as an automobile shelter.

It will be understood that any suitable means may be provided for effecting manual operation of the above described mechanism to extend or contract the tent, and that any suitable mechanical inter-connection may be provided between the roller operating mechanism and the means for effecting vertical movement of the inner ends of the end arms 17, and that various other modifications may be made in the construction without departing from the teachings of the invention.

I claim:

1. A contractible tent or awning comprising supporting means, a horizontal roller rotatably mounted on said supporting means, a flexible curtain means winding on said roller, screw threaded vertical rods rotatably mounted at the ends of the roller, slide members mounted to move vertically on said vertical rods and threadedly engaging the same to cause vertical movement of the slide members on rotation of the vertical rods, a cross bar attached to said flexible curtain means and provided with supporting arms pivotally connected to said slide members, and operating means connected to rotate the roller and the vertical rods simultaneously so as to raise the slide members and thereby extend the curtain means as the latter unwinds from the roller.

2. A construction as set forth in claim 1, wherein the thread means on the vertical rods are continued upwardly beyond a position corresponding to complete unwinding of the curtain means from the roller, so that on further operation of the operating means the curtain means will be partly wound on the roller in the opposite direction, and the supporting arms therefor will be further raised to proper position for full extension of the curtain means.

3. A contractible tent or awning comprising supporting means, a horizontal roller rotatably mounted on said supporting means, a flexible curtain means winding on said roller and including an inner section connected to the roller, an outer section connected to the inner section, and end flaps flexibly connected to the inner section, a cross bar connected to the curtain means at the junction of the inner and outer sections thereof and provided with arms, means for raising and lowering the inner ends of said arms, and operating means for simultaneously operating the roller and the means for moving said arms, the sections of the curtain means being provided with fasteners for detachably securing them together in folded position, and the outer section and the flaps being provided with fastening means for detachably securing them together in extended position.

4. A contractible tent or awning comprising casing means formed with a horizontal recess and with vertical recesses extending downwardly from the ends of the horizontal recess, a roller rotatably mounted in the horizontal recess, curtain means winding on said roller and adapted, when wound on the roller, to be housed in said recess, a cross bar connected to the curtain means and having arms, means mounted within the vertical recesses for operating the inner ends of said arms to raise and lower the same, means mounted within the recesses for operating the roller, and closure means for said recesses.

WILLIAM F. HEWLETT.